US006882938B2

(12) United States Patent
Vaage et al.

(10) Patent No.: US 6,882,938 B2
(45) Date of Patent: Apr. 19, 2005

(54) METHOD FOR SEPARATING SEISMIC SIGNALS FROM TWO OR MORE DISTINCT SOURCES

(75) Inventors: Svein Torleif Vaage, Houston, TX (US); Ruben D. Martinez, Sugar Land, TX (US); John Brittan, Walton-on-Thames (GB)

(73) Assignee: PGS Americas, Inc., Houston, TX (US)

( * ) Notice: Subject to any disclaimer, the term of this patent is extended or adjusted under 35 U.S.C. 154(b) by 28 days.

(21) Appl. No.: 10/630,385

(22) Filed: Jul. 30, 2003

(65) Prior Publication Data

US 2005/0027454 A1 Feb. 3, 2005

(51) Int. Cl.[7] ................................................ G01V 1/00
(52) U.S. Cl. ........................... 702/17; 702/14; 367/38; 367/43
(58) Field of Search .............................. 702/14, 15, 16, 702/17, 18; 367/38, 43

(56) References Cited

U.S. PATENT DOCUMENTS

| 4,910,716 | A | 3/1990 | Krilin et al. |
| 4,937,794 | A | 6/1990 | Marschall et al. |
| 5,761,152 | A | 6/1998 | Jacobsen et al. |
| 5,818,795 | A | 10/1998 | Hawkins et al. |
| 6,463,388 | B1 | 10/2002 | Martinez |
| 6,574,567 | B1 | 6/2003 | Martinez |
| 2002/0143470 | A1 * | 10/2002 | Borselen .................. 702/17 |
| 2002/0181328 | A1 | 12/2002 | de Kok |

OTHER PUBLICATIONS

Ruben D. Martinez, William H. Kamps, Victor A. Takh, "A Robust Method for 3D Noise Attenuation", Society of Exploration Geophysicists International Exposition and 70th Annual Meeting, Expanded Abstracts, Aug. 2000, pp. 2077–2080, vol. II, SP 6.2.

* cited by examiner

Primary Examiner—John Barlow
Assistant Examiner—Meagan S Walling
(74) Attorney, Agent, or Firm—E. Eugene Thigpen; Richard A. Fagin

(57) ABSTRACT

A method is disclosed for separating energy resulting from actuating at least two different seismic energy sources from seismic signals. The sources are actuated to provide a variable time delay between successive actuations of a first one and a second one of the sources. The method includes sorting the seismic signals such that events therein resulting from actuations of the first source are substantially coherent in all spatial directions, coherency filtering the first source coherency sorted signals, sorting the seismic signals such that events therein resulting from actuations of the second source are substantially coherent in all spatial directions, and coherency filtering the second source coherency sorted signals.

50 Claims, 14 Drawing Sheets

Ray Paths for Source Towed by Seismic Vessel

METHOD FOR SEPARATING SEISMIC SIGNALS FROM TWO OR MORE DISTINCT SOURCES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic exploration. More particularly, the invention relates to methods for acquiring marine seismic data using selected arrangements of sources and receivers.

2. Background Art

Seismic surveying is known in the art for determining structures of rock formations below the earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in the ocean, one or more air guns or water guns.

Seismic energy emanates from the source and travels through the earth formations until it reaches an acoustic impedance boundary within the earth formations. Acoustic impedance boundaries typically occur where the composition and/or mechanical properties of the earth formations change. At an acoustic impedance boundary, some of the seismic energy is reflected back toward the earth's surface, where it may be detected by one or more of the seismic sensors deployed on the surface. Other portions of the seismic energy are refracted and continue propagating in a generally downward direction until another acoustic impedance boundary is reached. Seismic signal processing known in the art has as an objective the determination of the depths and geographic locations of bed boundaries below the earth's surface from signals related to the reflected acoustic energy. The depth and the location of the bed boundaries is inferred from the travel time of the seismic energy to the acoustic impedance boundaries and back to the sensors at the surface.

Seismic surveying is performed in the ocean (and other large navigable bodies of water) to determine the structure of earth formations below the sea bed (or water bottom). Marine seismic surveying known in the art includes having a vessel tow one or more seismic energy sources, and the same or a different vessel tow one or more "streamers", which are arrays of seismic sensors forming part of or otherwise affixed to a cable at spaced apart locations along the cable. Typically, a seismic vessel will tow a plurality of such streamers arranged to be separated by a selected lateral distance from each other, in a pattern designed to enable relatively complete determination of subsurface geologic structures in three dimensions.

The signals detected by the seismic sensors at the earth's surface (or near the water surface) include components of seismic energy reflected at the bed boundaries, as previously explained. In addition, both coherent noise (noise which has a determinable pattern, such as may be caused by a ship propeller) and incoherent (random) noise may be present. The presence of such noise in the signals received by the seismic sensors reduces the signal-to-noise ratio ("SNR") of the seismic signals of interest. An objective of seismic signal processing is to substantially eliminate the effects of noise on the signals detected by the sensors without appreciably reducing the reflected seismic energy component of the detected signals.

Prior art methods which have been used to reduce the effects of noise and acquire a higher quality seismic representation of subsurface structures include using multiple actuations of the seismic energy source (multiple "firings" or "shots") to record a plurality of sensor measurements from substantially the same subsurface structure, and then summing or "stacking" such measurements to enhance signal strength while substantially reducing the effects of random or incoherent noise.

U.S. Pat. No. 5,818,795, which is assigned to the assignee of the present invention, provides a detailed summary of prior art methods and systems addressing the problem of noise elimination in seismic signals, and discloses as well a method of reducing the effect of "burst" noise in seismic signal recordings without eliminating signals related to reflected seismic energy.

In marine seismic surveying, it is known in the art to increase the effective subsurface length of coverage of a seismic streamer by using an additional seismic energy source at a spaced apart position along the survey line (direction of travel of the seismic vessel). The additional seismic energy source may be towed ahead of or behind the vessel that tows the other source and/or the seismic streamer (s). Generally speaking, methods known in the art include firing the first source and recording signals resulting therefrom, waiting a selected delay time to allow seismic energy from the first source to attenuate, and then actuating the second source. U.S. Pat. No. 5,761,152, which is assigned to the assignee of the present invention, describes a method and system for marine seismic surveying which increases the fold (number of recorded reflections from a same reflector), and hence the signal-to-noise ratio of seismic signals, without incurring the problems of drag, entanglement, complicated deck handling, and decreased signal-to-noise ratio associated with increased streamer length, increased number of streamers, and increased distance between streamers. Source and streamer "offsets", and time of firing of lead and trailing vessel sources in a time delay sequence are optimized to increase the fold while avoiding any influence by the seismic signals resulting from the source of one vessel on the seismic signals resulting from the source of the other vessel.

A limitation to methods known in the art for using more than one seismic source, such as disclosed in the '152 patent, for example, is that it is necessary to wait a substantial amount of time, typically several seconds or more, between firing the first source and firing the second source, to enable identification of the energy in the recorded seismic signals as having been caused by the first or the second source. Such identification is necessary in order to properly interpret subsurface structures from the detected seismic signals. The waiting time between firing the first source and the second source reduces the speed at which seismic surveys can be recorded, and thus reduces the efficiency of making such surveys. Accordingly, it is desirable to be able to reduce the waiting time in multiple source seismic surveys to a minimum.

SUMMARY OF THE INVENTION

One aspect of the invention is a method for separating energy resulting from actuating at least two different seismic energy sources from seismic signals. The seismic energy sources are actuated to provide a variable time delay between successive actuations of a first one and a second one of the sources. The method includes sorting the seismic signals such that events therein resulting from actuations of the first source are substantially coherent in all spatial directions. The first source coherency sorted signals are then coherency filtered. The method then includes sorting the seismic signals such that events therein resulting from actuations of the second source are substantially coherent in all spatial directions. The second source coherency sorted signals are then coherency filtered. In one embodiment, the coherency filtering comprises weighted slant stack processing.

Another aspect of the invention is a method for seismic surveying. A method according to this aspect of the invention includes towing a first seismic energy source and at least one seismic sensor system. A second seismic energy source is towed at a selected distance from the first seismic energy source. The first seismic energy source and the second seismic energy source are actuated in a plurality of firing sequences. Each of the firing sequences includes firing of the first source, firing the second source and recording of the signals detected by the at least one seismic sensor system. A time interval between firing the first source and the second source varies between successive firing sequences. The seismic signals are sorted such that events therein resulting from actuations of the first source are substantially coherent in all spatial directions. The first source coherency sorted signals are coherency filtered. The seismic signals are then sorted such that events therein resulting from actuations of the second source are substantially coherent in all spatial directions, and the second source coherency sorted signals are coherency filtered. In one embodiment, the coherency filtering comprises weighted slant stack processing.

Other aspects and advantages of the invention will be apparent from the following description and the appended claims.

DETAILED DESCRIPTION

The invention relates generally to methods for acquiring marine seismic data which use more than one seismic energy source, or source array. The sources, or source arrays are disposed at spaced apart locations along or parallel to a survey line. Using spaced apart sources, or source arrays, enables increasing the effective subsurface coverage of a "line", "string" or array of seismic receivers (sensors) with respect to what may be possible using only a single source, or source array. The invention is also related to methods for identifying which one of the seismic sources caused particular events in the signals detected by the seismic sensors. Identifying which seismic source caused the particular events is important for determining subsurface structures from the seismic signals, and may be used to reduce the effects of coherent and random noise in the recorded seismic signals.

In the description below, the term "seismic source" is used to describe a single seismic source, or an array of seismic energy sources. The sources can be, for example, air guns and water guns. Where an array of air guns or water guns is used, the guns are fired substantially simultaneously to produce a single "shot" of seismic energy. Therefore the number of individual air guns or water guns in any implementation of a "seismic source" is not a limitation on the scope of the invention. A seismic vessel will typically tow one, two or more such seismic sources, each of which is actuated ("fired") at separate times. In the following description of methods according to the invention, two such seismic sources are used. It should be clearly understood that a method and system according to the invention can have two sources towed as a single source towed from a single seismic vessel followed by a second source towed by a second "source vessel", or more than two sources can be towed by one or more such vessels. Also, where more than one seismic and/or source vessel is used in a particular survey it is not necessary for each of the vessels operating together in the survey to tow the same number of sources.

Figure 1:
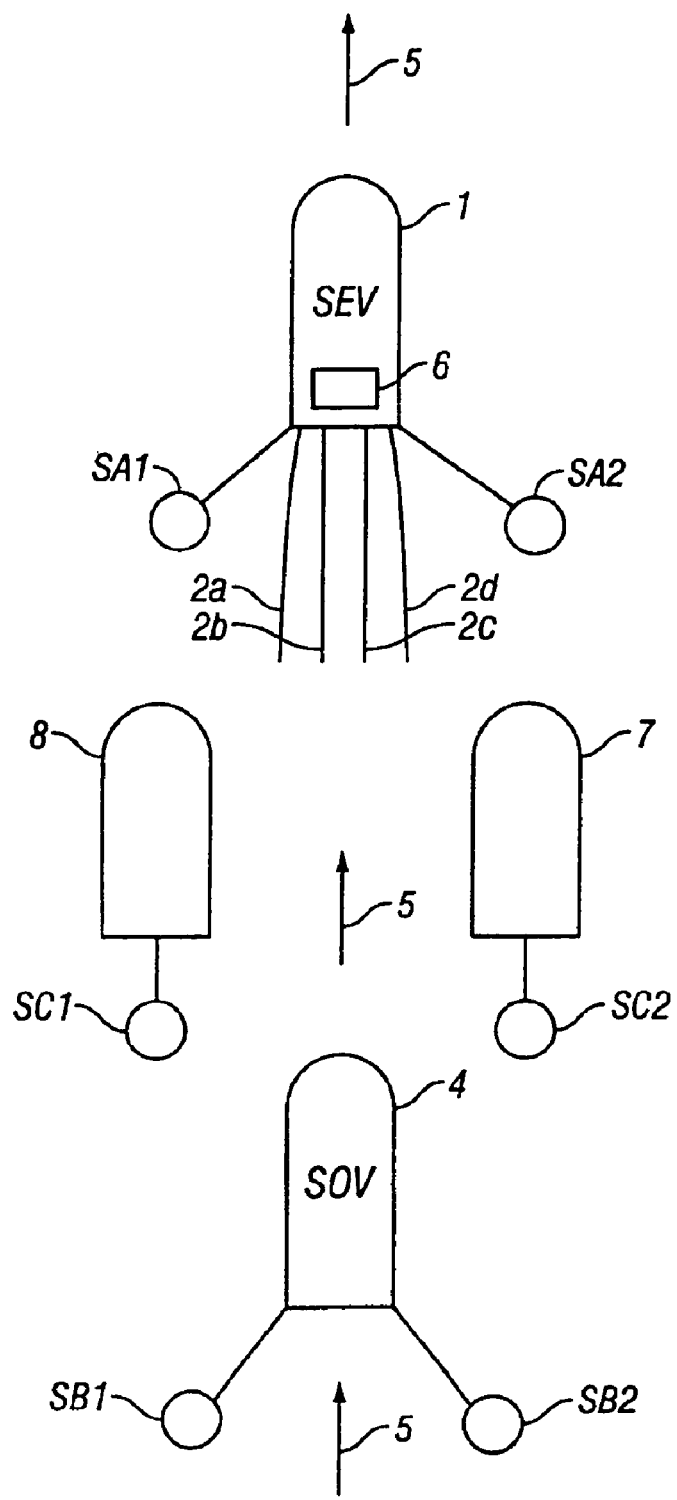
FIG. 1 is a diagram of one embodiment of a marine seismic acquisition system according to the invention.

FIG. 1 shows one example of a marine seismic data acquisition arrangement. the arrangement in FIG. 1 may be used to record seismic signals that can be processed using methods according to the invention. A seismic recording vessel (SEV) 1 tows first seismic sources SA1, SA2, and one or more "streamers" or seismic sensor arrays as shown at 2a–2d.

Each streamer 2a–2d includes a plurality of seismic sensors (typically hydrophones—not shown individually) disposed thereon at spaced apart locations along each streamer 2a–2d. The streamers 2a–2d are disposed along lines substantially parallel to the survey line 5. The sensors (not shown) in the streamers 2a–2d are operatively coupled to a recording system 6 disposed on the SEV 1.

A source vessel (SOV) 4 trails the SEV 1 along the survey line 5. The SOV 4 tows second seismic sources SB1–SB2 The second sources SB1, SB2 are towed at a selected distance from the first sources SA1, SA2.

The seismic recording system 6 may also include navigation equipment (not shown separately) to enable precisely determining the position of the vessels 1, 4 and the individual sensors (not shown separately) as seismic signals are recorded. The seismic recording system 6 may also include a source controller which selectively controls actuation of the one or more sources towed by the SEV 1 and by the SOV 4. Timing of source actuation by the source controller (not shown separately) will be further explained.

Each of the seismic sources SA1, SA2, SB1, SB2 in this embodiment, as previously explained, will typically include an array of air guns. Such arrays are used, for among other reasons as is known in the art, to provide "whiter" seismic energy (including a broader range of frequencies and having a more nearly constant amplitude for such frequencies). FIG. 1 also shows the second sources SB1–SB2 towed by the SOV 4 behind the seismic vessel 1. The second seismic sources may alternatively be towed in front of the SEV 1 at a selected distance. In other embodiments, the seismic acquisition system may include additional source vessels, shown generally at 7 and 8 in FIG. 1. These additional source vessels 7, 8 may each tow one or more additional seismic sources, shown generally at SC1 and SC2.

The first SA1, SA2 and second SB1, SB2 seismic energy sources are used in marine seismic surveying to increase the coverage area of the seismic data detected by the streamers 2a–2d, and recorded by the recording system 6. Typically, each of the sources SA1, SA2, SB2, SB2 will be actuated in a sequence which reduces interference in the recorded signals. For purposes of the description which follows of methods according to the invention, a "first source" can be either one of the sources towed by the SEV 1, these being sources SA1 and SA2. A "second source" referred to in the description can be either one of the sources towed by the SOV 4, these sources being SB1 and SB2.

As previously explained, it should be understood that for purposes of defining the scope of the invention, it is not necessary to have a separate source vessel, or source vessels, to tow the second source (or any additional sources) as shown in FIG. 1, although having such a separate source vessel provides practical benefits such as increasing the effective subsurface coverage of the streamers 2a–2d, as is known in the art. For purposes of defining the scope of this invention, it is only necessary to have two seismic energy sources, where the second seismic energy source (or source array) is towed along (or parallel to) a survey line, such as 5 in FIG. 1, at a selected distance from the first seismic source (or source array).

During acquisition of seismic signals, the fist sources SA1, SA2 and the second sources SB1, SB2 are sequentially fired in a plurality of firing sequences, the timing of which will be further explained, and signals detected by the sensors (not shown) on the streamers 2a–2d are recorded by the recording system 6.

Figure 2:
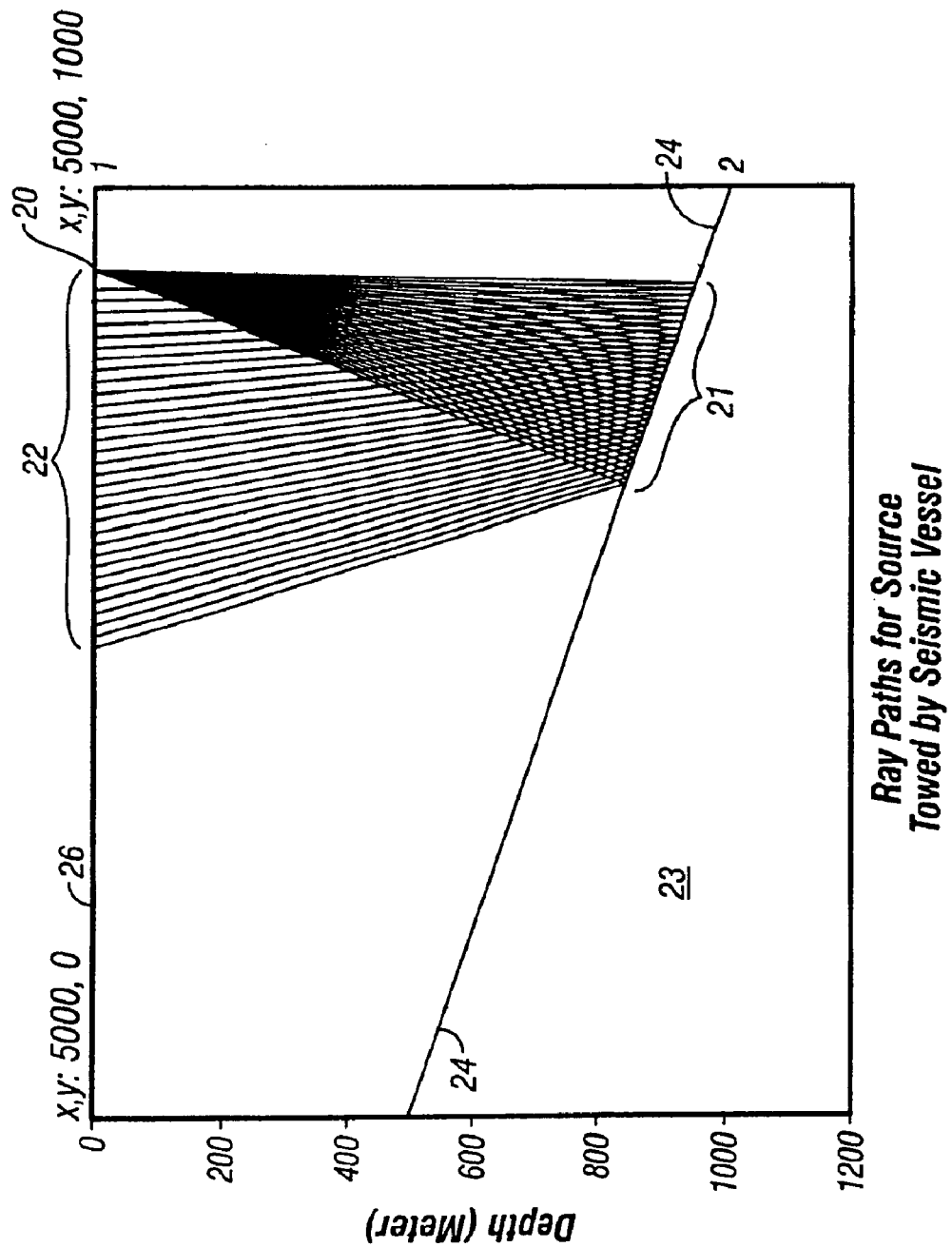
FIG. 2 shows an example of seismic energy paths (ray paths) from a source to a plurality of seismic receivers towed by a vessel as the seismic energy reflects from an acoustic impedance boundary.

FIG. 2 shows an example of paths 21 ("ray paths") of seismic energy as it travels from the first sources or source arrays (SA1–SA2 in FIG. 1), the location along the survey line (5 in FIG. 1) of which is shown at 20, downward through the water 26, to a subsurface acoustic impedance boundary (bed boundary) 24. Some of the seismic energy is reflected from the bed boundary 24 and travels upwardly through the water 26 where it is detected by the sensors on each of the streamers (2a–2d in FIG. 1), the locations of some of which are shown at 22. The ray paths 21 shown in FIG. 2 correspond to the path traveled by the seismic energy to each tenth sensor in one of the streamers (2a–2d in FIG. 1), recordings of which will be shown and explained below with reference to FIGS. 4–13.

Figure 3:
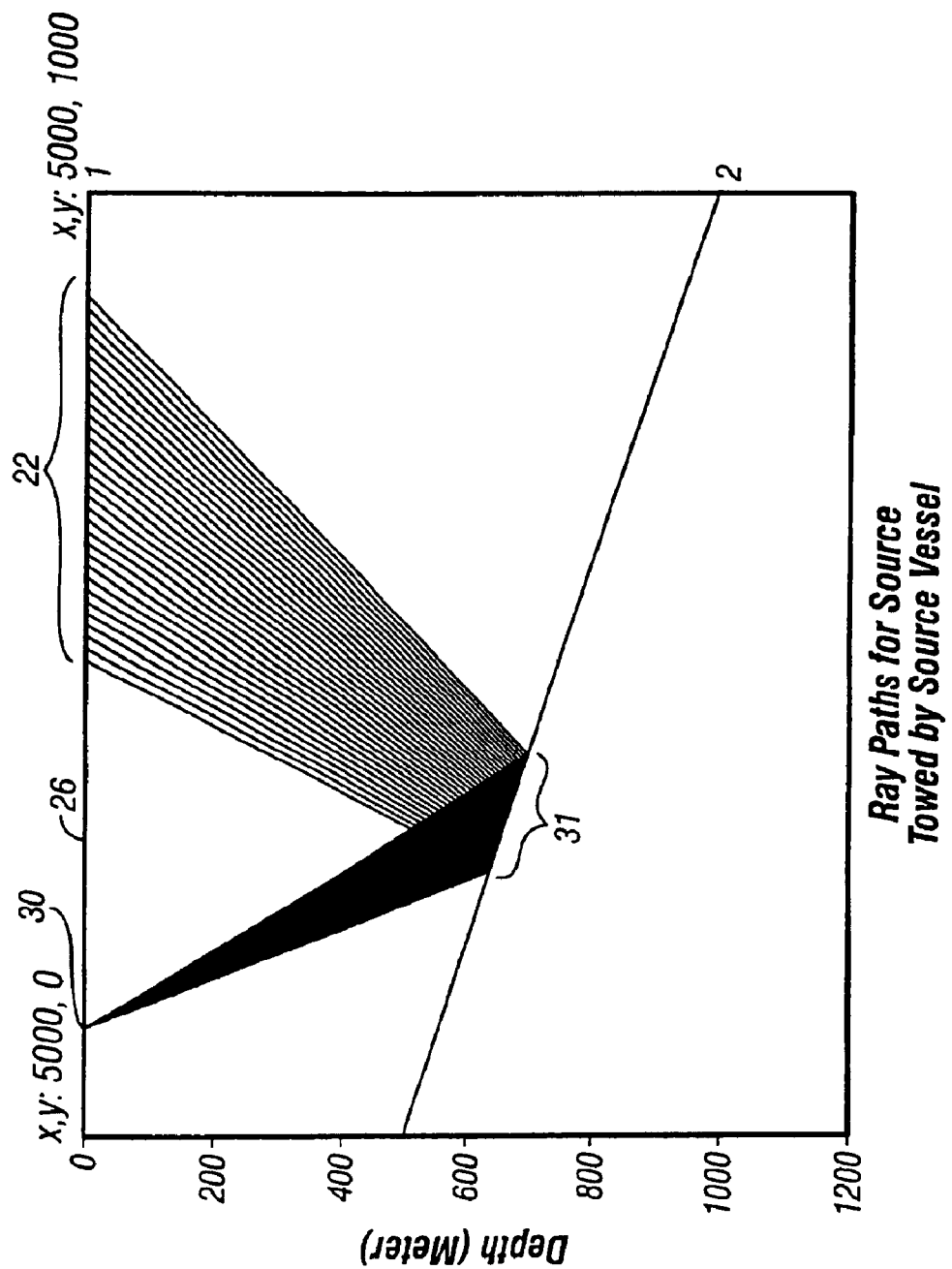
FIG. 3 shows an example of seismic ray paths for seismic energy from a source towed by a source vessel to the seismic receivers towed by the seismic recording vessel in FIG. 1.

FIG. 3 shows ray paths 31 for acoustic energy traveling from the second sources (SB1–SB2 as shown in FIG. 1), the position of which is shown at 30 in FIG. 3. The sensor positions 22 are substantially the same as those shown in FIG. 2, because the second source (or array) is actuated at a time delay with respect to actuation of the first source (or array) such that the seismic and source vessels, and thus the towed sources and receivers, move only a very small distance along the water 26 during the delay time. In FIG. 3, the position of the second source 30 with respect to the streamers and first source is typically selected such that the ray paths from 31 from the second source have different reflection locations along the boundary 24 than do the ray paths from the first source, such as shown in FIG. 2.

As explained above in the Background section, prior art methods for using two or more spaced apart sources in an arrangement such as shown in FIG. 1 include firing the first source, and waiting before firing the second source a sufficient amount of time such that signals detected by the sensors resulting from firing the first source have substantially attenuated. In methods according to the invention, the second source is fired after a relatively small selected delay time after firing the first source, such that signals from the first source that have substantial amplitude are still being detected by the sensors.

In a method according to one aspect of the invention, the first source is actuated or "fired" and a recording is made of the signals detected by the sensors that is indexed to a known time reference with respect to time of firing the first source. The second source (or array) is then fired at a predetermined delay time after the firing of the first source, while signal recording continues. Firing the first source, waiting the predetermined delay time and firing the second source is referred to herein as a "firing sequence." Firing the first source, waiting a predetermined time delay firing the second source, while recording seismic signals, are then repeated in a second firing sequence. The firing sequence is then repeated, using a different delay time. The predetermined time delay between firing the first source and firing the second source is different for the second, and for each subsequent firing sequence in a survey. For purposes of the invention, seismic signals are recorded for a plurality of such firing sequences, typically three or more firing sequences, each having a different predetermined time delay between firing the first source and firing the second source.

Although the time delay varies from sequence to sequence, the time delay between firing the first source and the second source in each firing sequence is preferably at least as long as the "wavelet" time of the seismic energy generated by the first source to avoid interference between the first and second sources. Typically, however, the time delay is less than one second, but in some cases may be several seconds. In some embodiments, the time delay between successive firing sequences may vary in a known, but random manner. In other embodiments, the time delay may vary in a known, but quasi-random manner. In still other embodiments, the time delay may be varied systematically. Examples of seismic signals as will be explained below with reference to FIGS. 4–13 may include a time delay variation between successive firing sequences of about 100 milliseconds.

Firing the first source and the second source in a plurality of firing sequences as described above, each having a different time delay, enables separating components of the detected seismic signals which result from the first source and from the second source, as will be explained below with respect to FIGS. 4–14.

Figure 4:
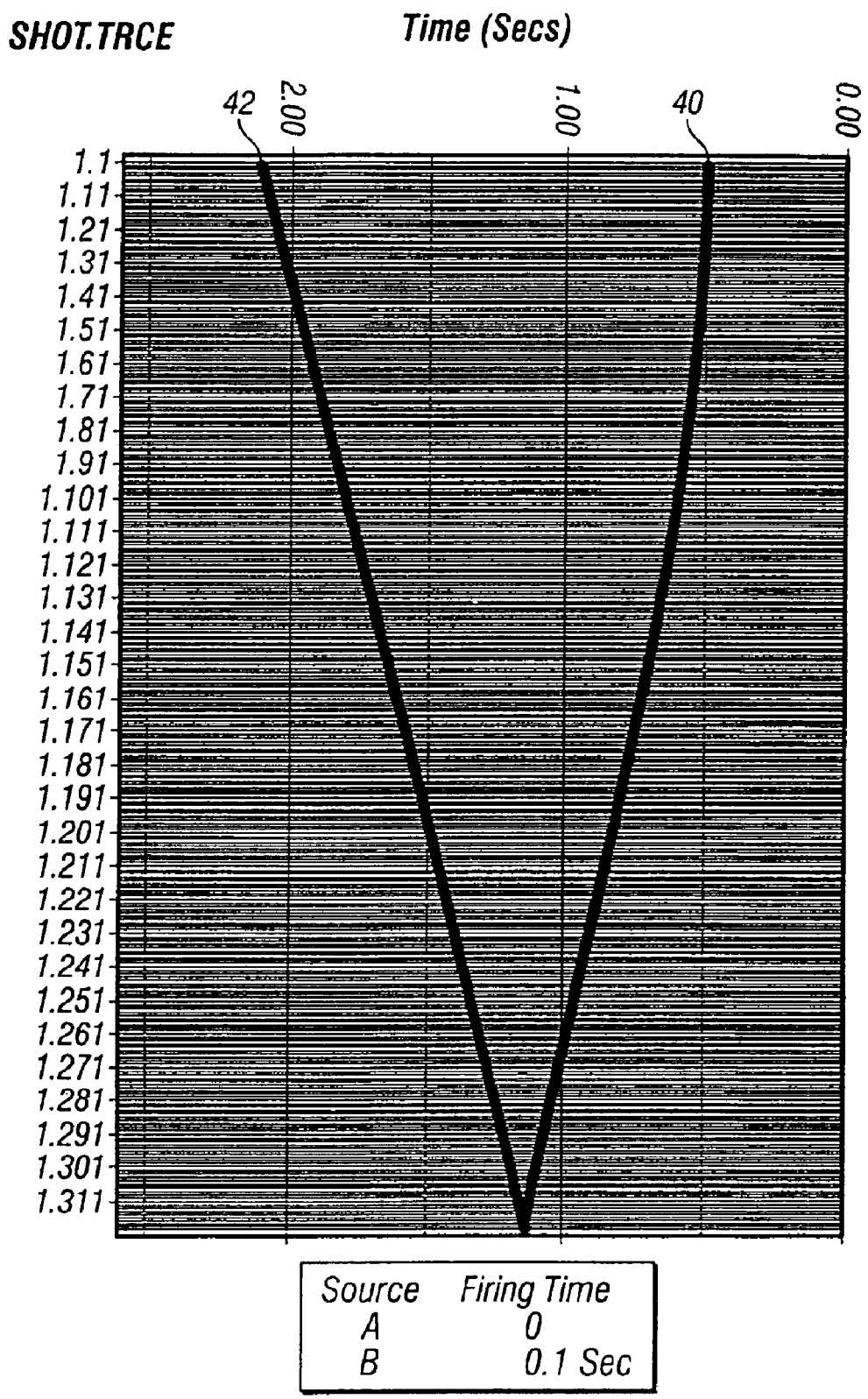
FIGS. 4 through 13 show example recordings of individual receiver signals from the example "shots" shown in FIGS. 2 and 3 in order to explain an acquisition technique according to one aspect of the invention.

FIG. 4 shows a graphic display of amplitude indexed to the time of source actuation of the signals as would be detected by each of the sensors in one of the streamers (2a–2d in FIG. 1) towed by the seismic vessel (I in FIG. 1). The signals shown in FIG. 4 were synthesized for an example earth model such as the one shown in FIGS. 2 and 3. The display in FIG. 4 shows signals resulting from a single firing of the first source, followed by a single firing of the second source after a predetermined time delay. The display in FIG. 4 is arranged such that the signal from the sensor towed closest to the seismic vessel is on the left hand side of the display. The sensor signal displays or "traces" displayed from left to right in FIG. 4 represent the individual sensor signals from successively more distant (from the seismic vessel) ones of the sensors. Reflected seismic energy originating from the first source (or array, the position of which is shown at 20 in FIG. 2) appears as a high amplitude event that may be correlated in each successive trace, as shown at 40. Signals from the second source (or array, the position of which is shown at 30 in FIG. 3) that correspond to reflected energy from the same subsurface boundary (shown at 24 in FIGS. 2 and 3) can be identified by another event shown at 42. As would be expected, the event 40 resulting from the first source shows increased arrival time with respect to individual sensor distance from the first source in a well known relationship called "moveout." Correspondingly, the signals from the second source show moveout for event 42 in the opposite direction because of the placement of the second source with respect to the streamers (2a–2d in FIG. 1).

The table in FIG. 4 shows, for each source, a time of firing of each source with respect to a time index for signal recording. For the sake of brevity of description that follows, the first source (or source array) will be referred to in corresponding tables in each Figure as "source A" and the second source (or source array) will be referred to as "source B." The time delay between firing source A and source B identified in FIG. 4 is 0.1 second (100 milliseconds).

Figure 5:
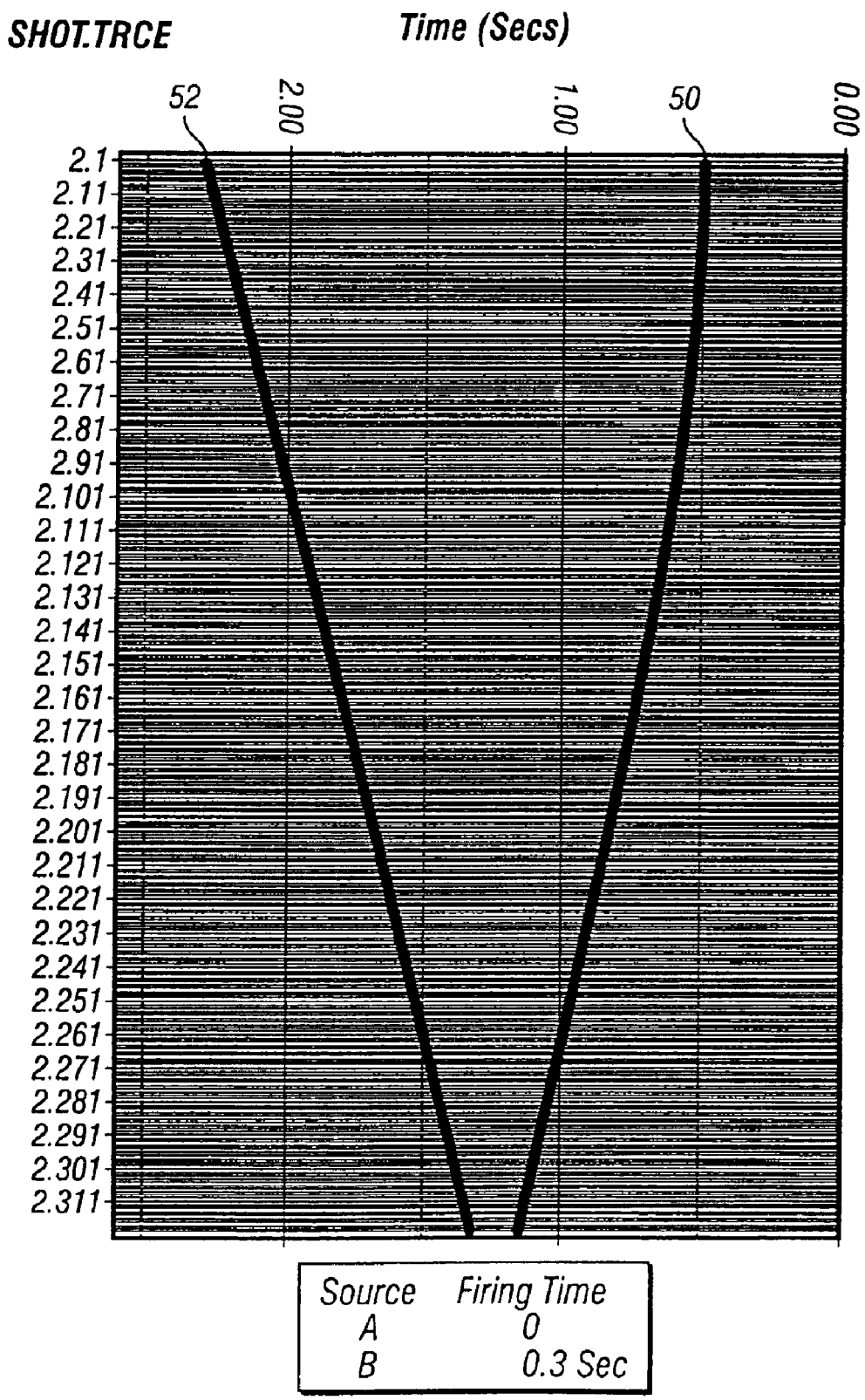

A display of synthesized signals resulting from a second firing sequence of sources A and B, for the earth model of FIGS. 2 and 3, is shown in FIG. 5. The firing sequence for which detected signals are shown in FIG. 5 is made at a selected time after recording the signals from the first firing (corresponding signals for which are shown in FIG. 4). This selected time depends on factors such as an approximate depth to which seismic analysis is desired to be performed, length of the streamers (2a–2d in FIG. 1), as is well known in the art, and typically is in a range of about 8 to 20 seconds. Arrival of reflective events corresponding to the events shown at 40 and 42 in FIG. 4 is shown for source A at 50 in FIG. 5 and for source B at 52. As shown in the table in FIG. 5, the selected time delay between firing source A and source B is 0.3 seconds (300 milliseconds).

Figure 6:
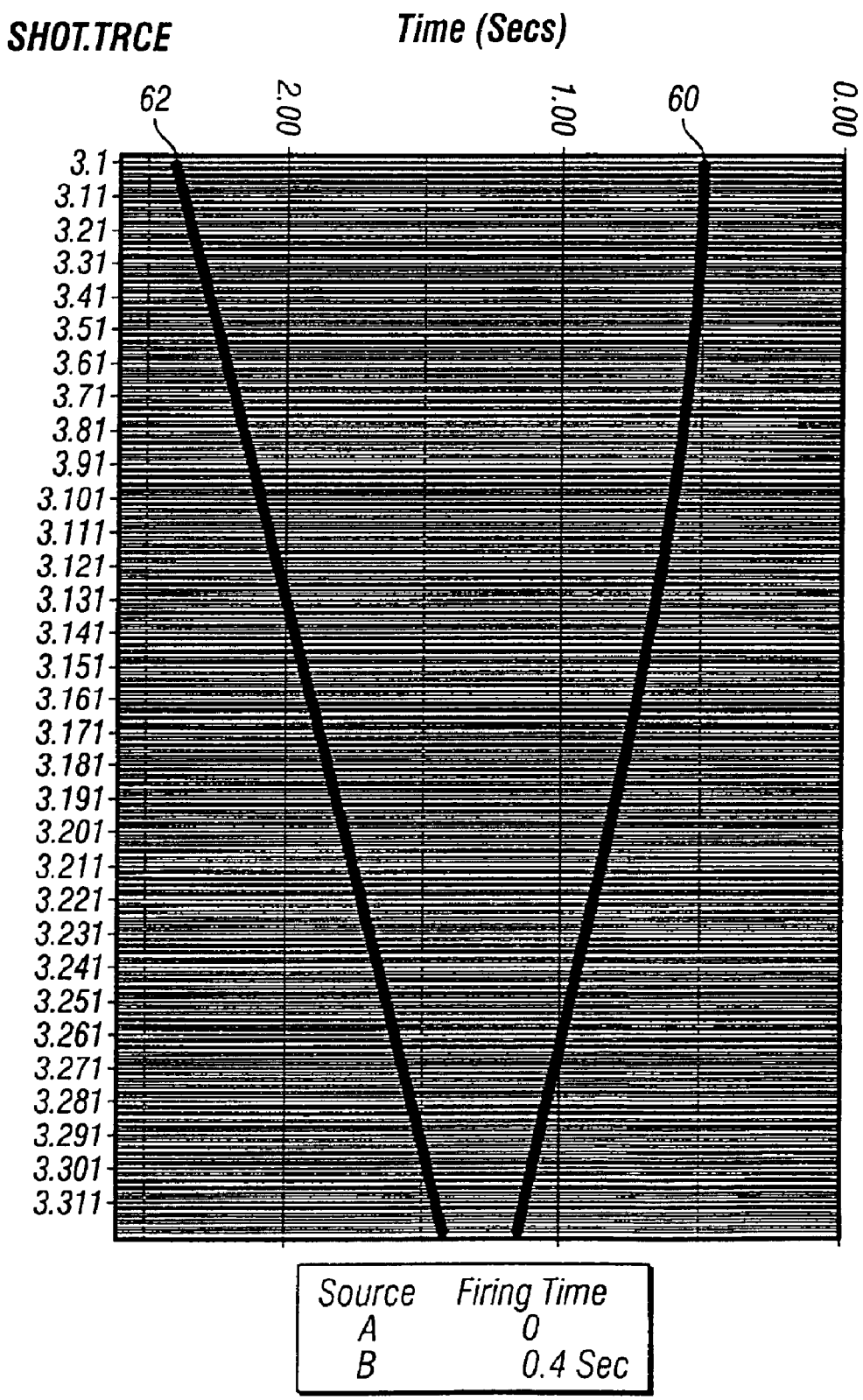

FIG. 6 shows a display similar to the ones shown in FIGS. 4 and 5, with corresponding reflective events for source A shown at 60 and for source B and 62. The display in FIG. 6 represents signals for a third firing sequences of the sources. And wherein the time delay between firing source A and source B is 0.4 seconds (400 milliseconds).

Figure 7:
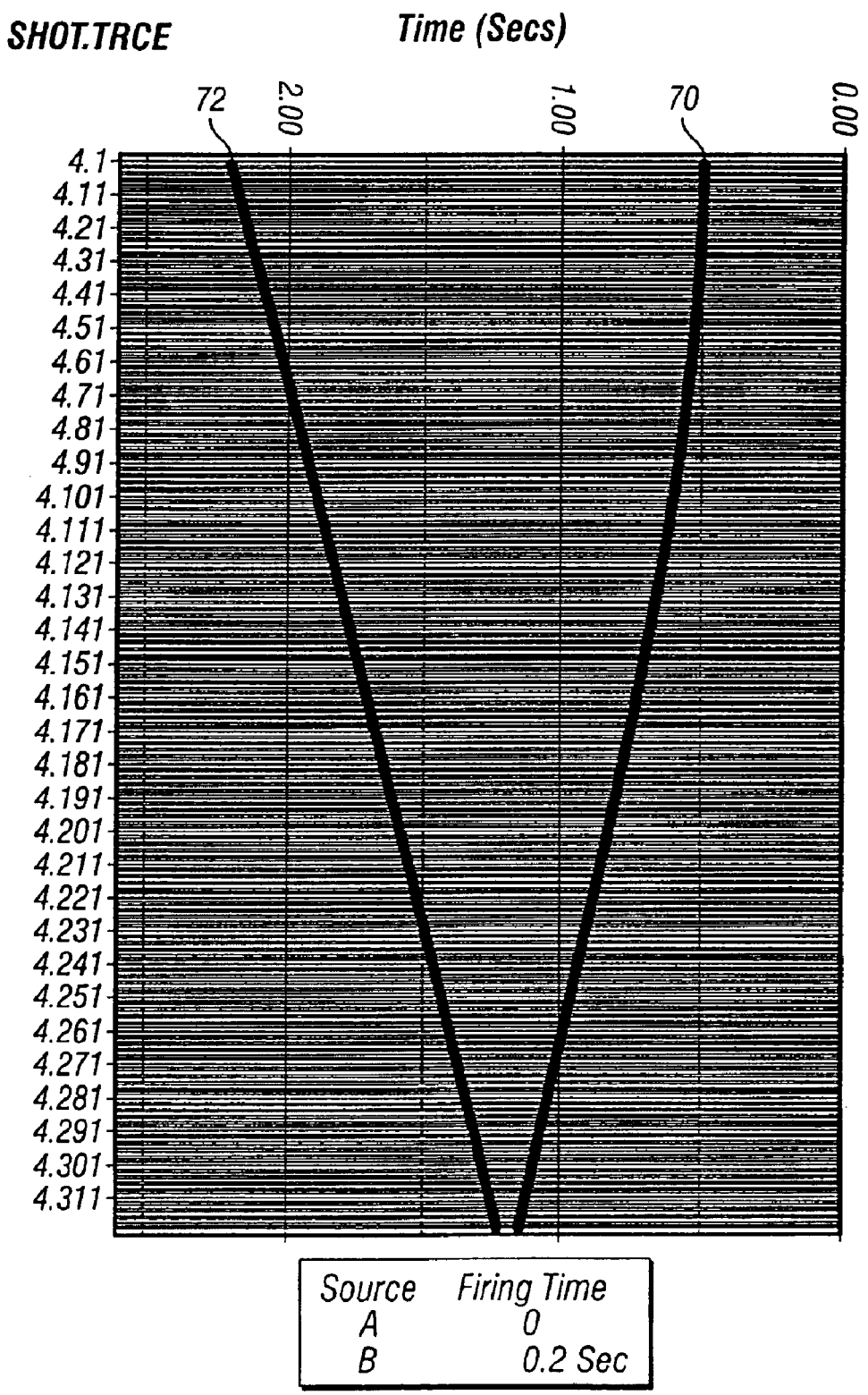

FIG. 7 shows a display of signals for a fourth firing sequence of source A and source B, wherein the selected time delay between firing source A and source B is 0.2 seconds (200 milliseconds). Corresponding reflective events 70 and 72 are shown for source A signals and source B signals, respectively.

Figure 8:
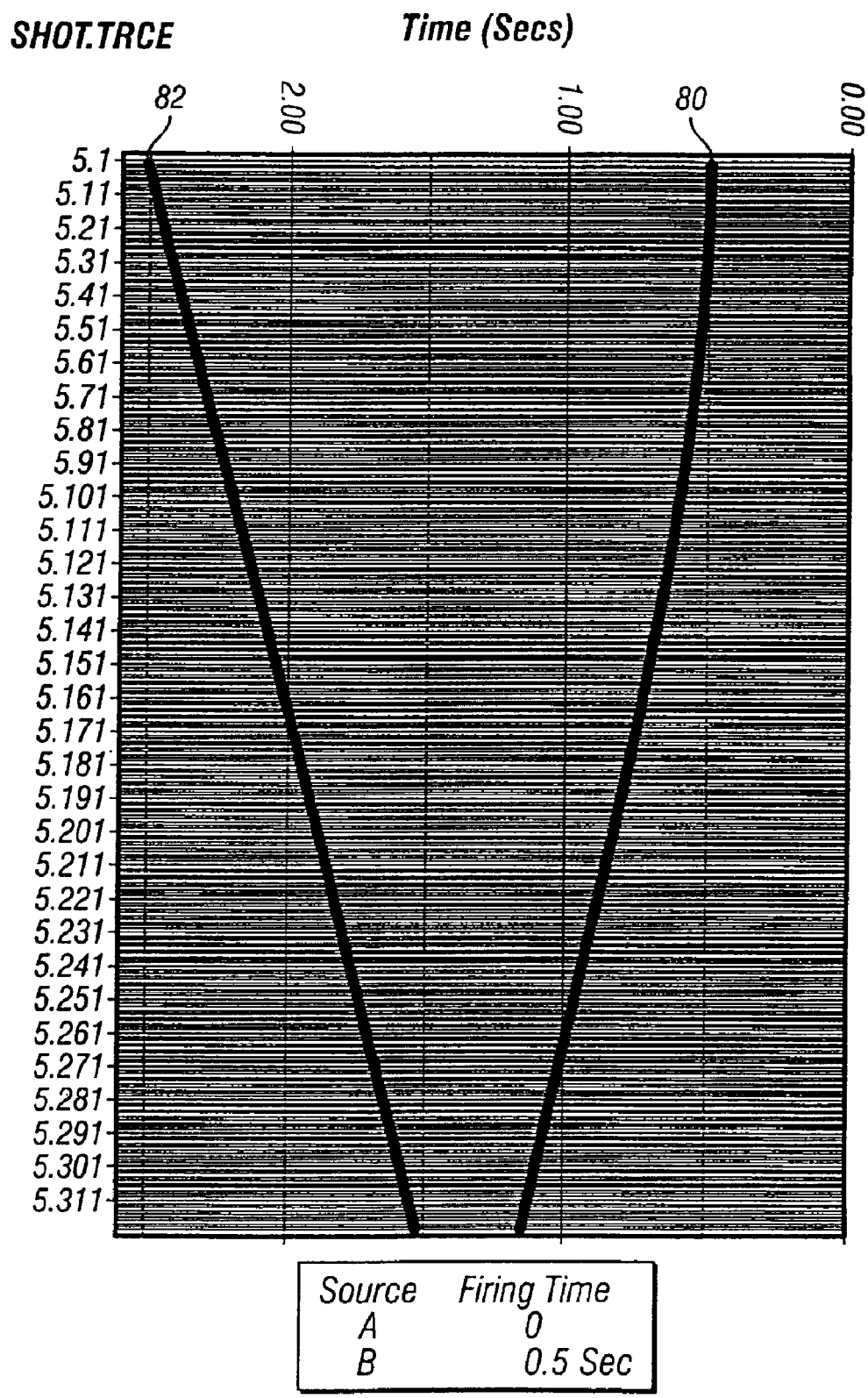

FIG. 8 shows a display of signals for a fifth firing sequence of source A and source B, wherein the selected time delay is 0.5 seconds (500 milliseconds). Corresponding reflective events 80 and 82 are shown for source A signals and source B signals, respectively.

Reflection events corresponding to signals from source A, shown at 40, 50, 60, 70 and 80, respectively, in FIGS. 4 through 8, occur at very similar times with respect to the time of firing of source A. Differences in arrival time between traces for each such event corresponding to source A may depend on the actual position of the seismic vessel (1 in FIG. 1) at the time of each source A firing, which position depends on vessel speed and time between firing sequences. The arrival time of the source A events may also depend on the subsurface structure of the earth, among other factors. Nonetheless, there is a very high degree of correspondence between the source A reflection events 40, 50, 60, 70, 80, respectively, in each of FIGS. 4 through 8.

In some embodiments of a method according to the invention, detected seismic signal components corresponding to the firing of source A can be identified in the seismic traces by a two part procedure. The first part includes determining coherence between the traces within an individual firing sequence. This part can be performed by selecting closely spaced subsets of all the traces (such as a subset of between five and ten traces) such as shown in FIGS. 4 through 8, and determining coherence between the selected traces within selected-length time windows. Coherence may be determined, for each subset of traces selected, by correlating the traces to each other over the selected-length time windows. A result of the correlation is a curve or trace the amplitude of which represents degree of correspondence from trace to trace with respect to time.

The coherence between traces determined in the first part of the procedure includes components that are also coherent between firing sequences with respect to the firing time of source A. These components represent the component of the seismic signals corresponding to actuating source A. The trace correspondence determined in the first part of the method may also include coherent noise, such as would result from signals caused by actuation of source B, shown as events 42, 52, 62, 72 and 82, respectively in FIGS. 4 through 8, or other coherent noise such as from a ship propeller. Random noise is substantially not present in the correspondence traces because random noise has substantially no correspondence from trace to trace. The second part of the method includes separating the components of the signals which are caused by source A from the coherent noise. In one embodiment, separation of the source A component can be performed by generating trace to trace coherence measures (traces), as just described, for each of a plurality of firing sequences. Corresponding ones of the coherence traces are then correlated to each other between firing sequences, to generate shot to shot coherence traces. The resulting shot to shot coherence traces will substantially represent seismic signals resulting only from source A. Coherent noise from source B and other coherent noise sources will be substantially absent from the shot to shot coherence traces.

The reason the source B "noise" is substantially removed by the shot to shot coherence determination can be explained as follows. As can be observed in FIGS. 4 through 8, the arrival time of successive source B events 42, 52, 62, 72, 82, respectively, is very similar between individual traces, and so would show a high trace to trace coherence. Difference in coherence in the source B events is substantially between firing sequences (when time is indexed with respect to the firing time of source A). This difference in coherence in the source B events is primarily because of the different time delay between firing source A and source B in each firing sequence. Therefore, while the events 42, 52, 62, 72, 82 may show high coherence from trace to trace, they will have substantially no coherence from shot to shot when the recording time is indexed to source A. Coherent noise, such as from a ship propeller, would show similar trace to trace coherence but relatively little shot to shot coherence.

Figure 9:
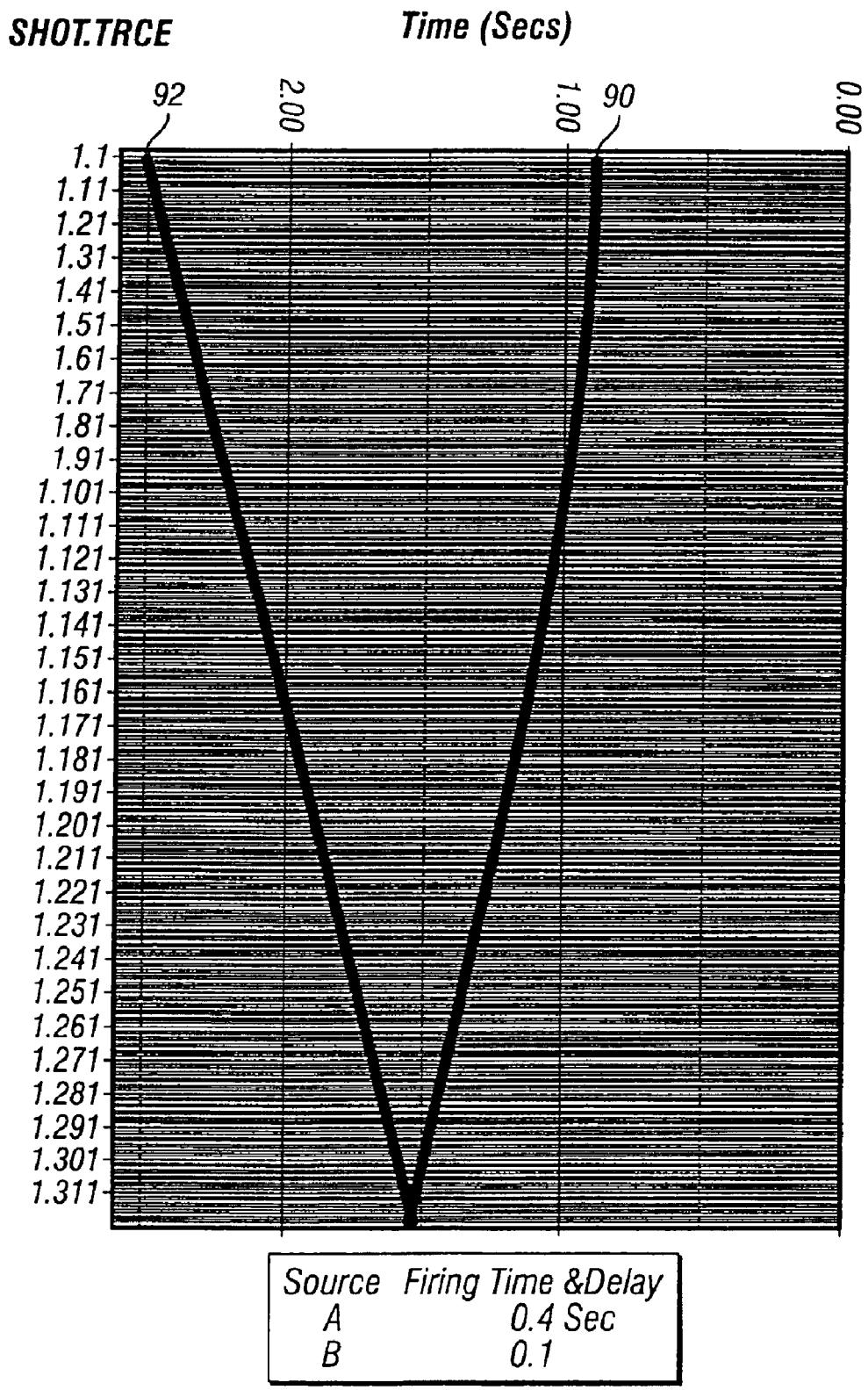
Figure 10:
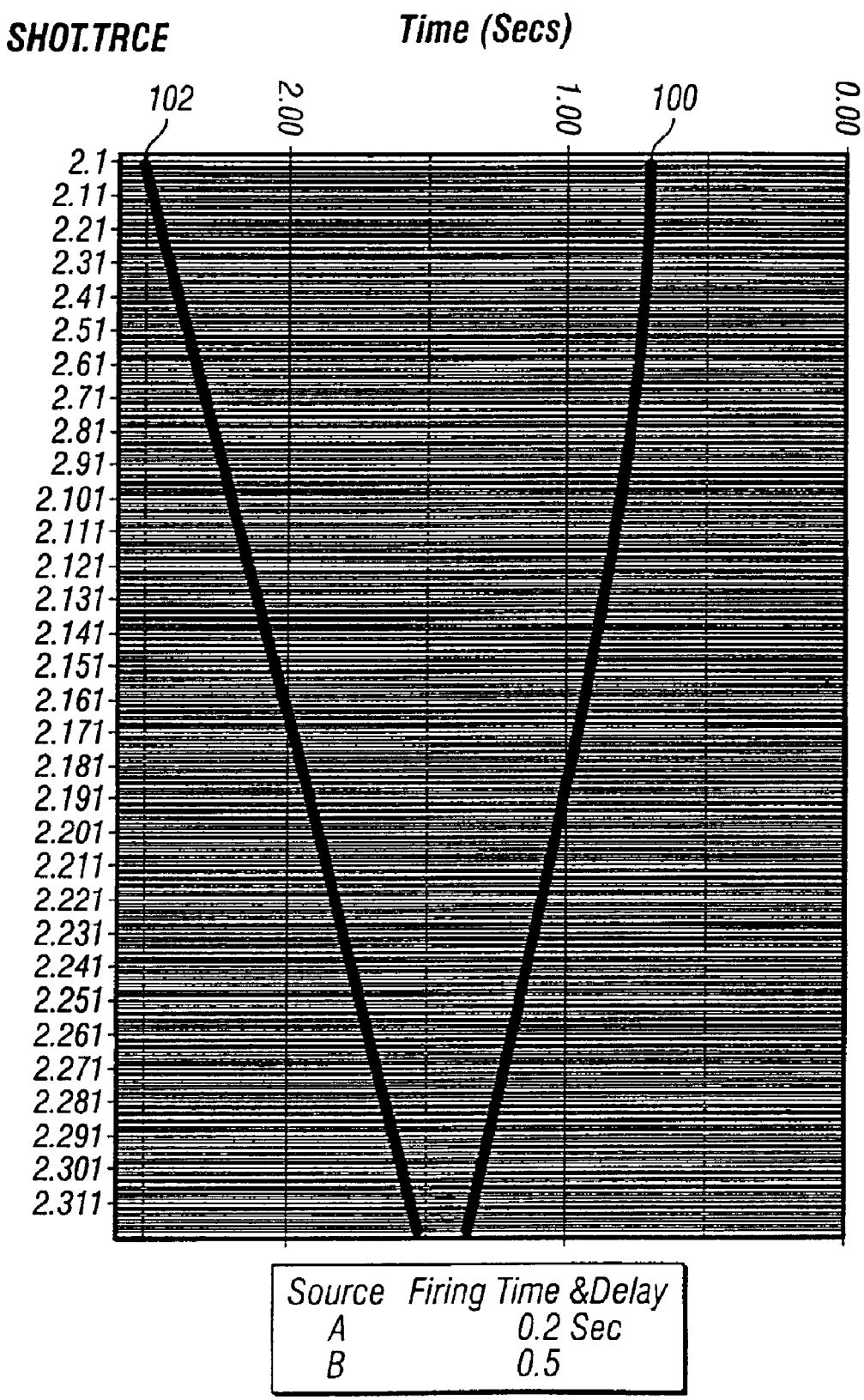
Figure 11:
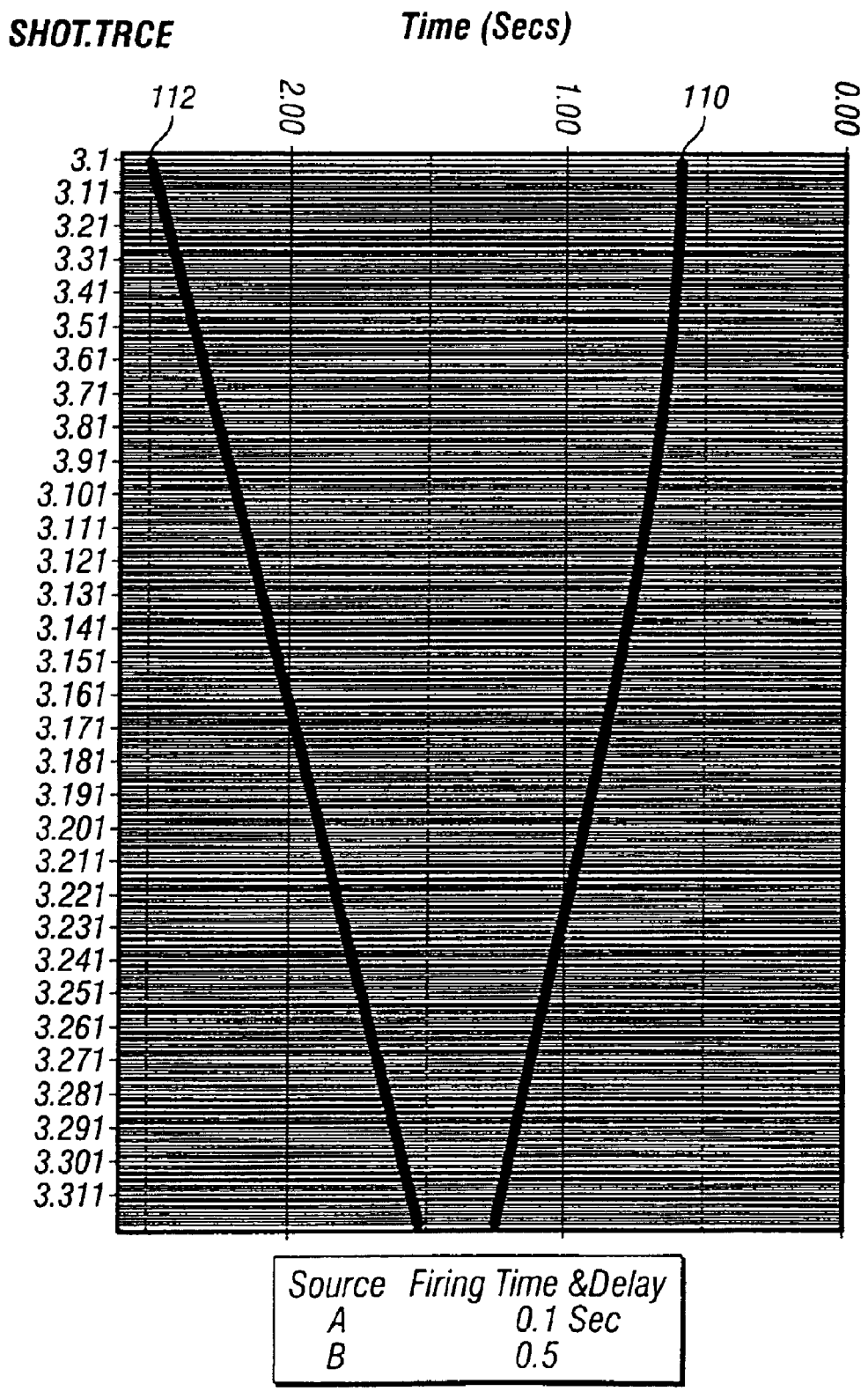
Figure 12:
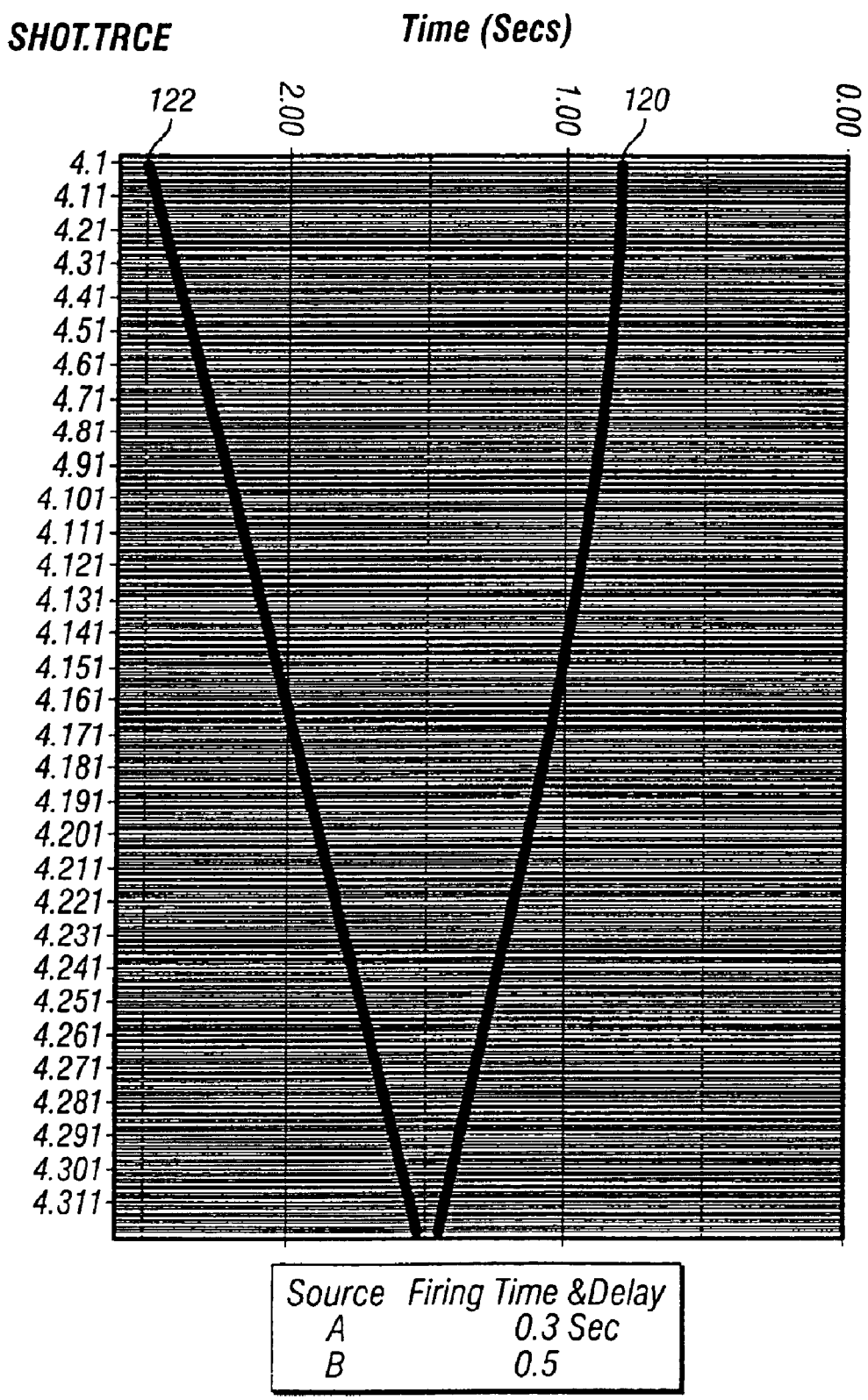
Figure 13:
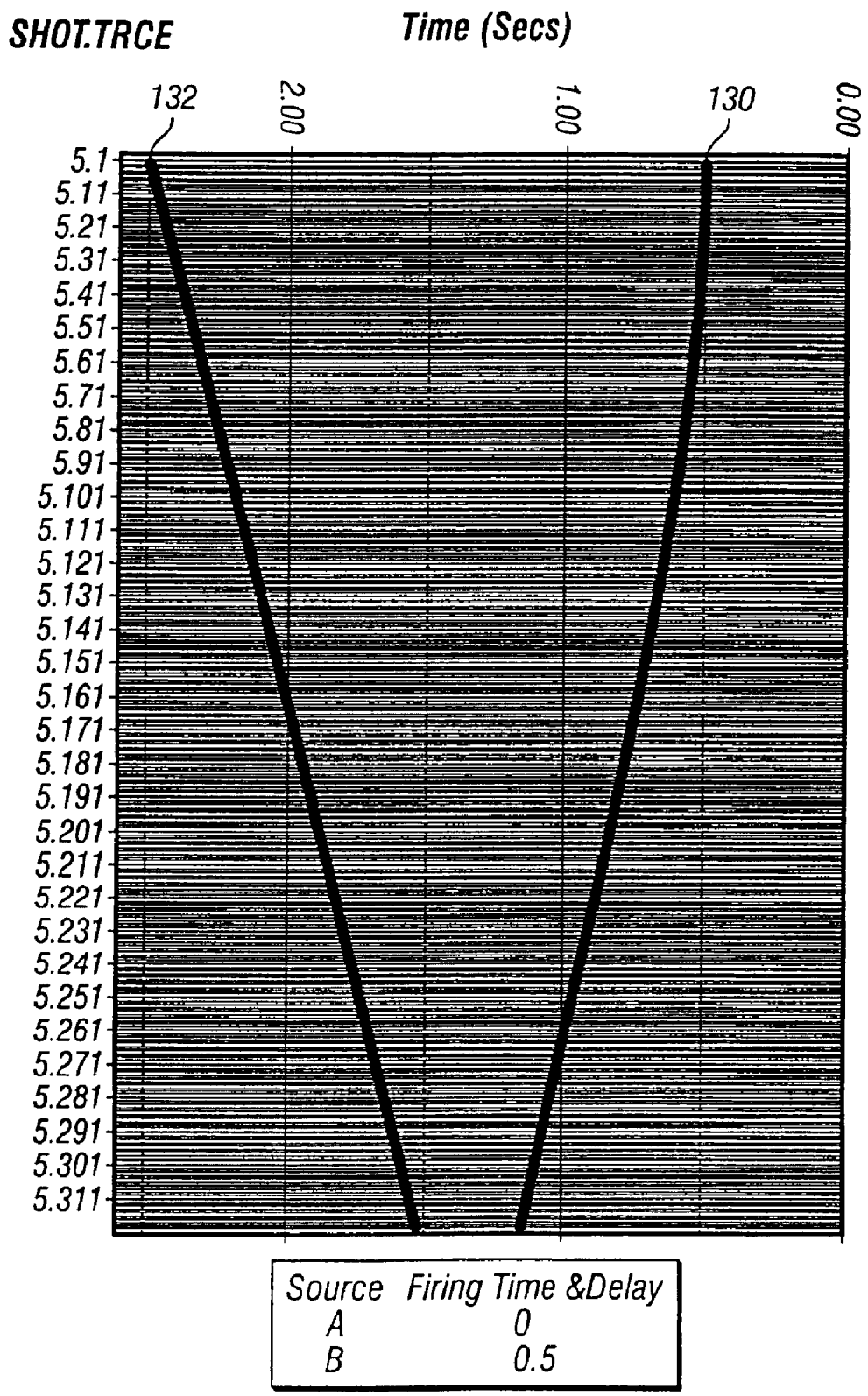

Having thus identified the "true" seismic signals originating from the first source (source A), one embodiment of a method according to the invention further includes identifying the "true" seismic signals originating from the second source (source B). This can be performed by time-aligning the signals from each firing sequence with respect to the firing time of source B. In some embodiments, this can be performed by applying a time delay to each trace such that the signals from source B all represent a same time delay from the start of signal recording or from a selected time index related to the time of firing of source B. FIG. 9 shows trace display of the same signals shown in FIG. 4, but with the addition of a time delay of 0.4 seconds, as shown in the table in FIG. 9. FIG. 10 shows the same signal traces as shown in FIG. 5, but with the addition of a time delay of 0.2 seconds. Similarly, FIGS. 11 trough 13 show traces which correspond to traces shown in FIGS. 6 through 8, but with time delays of 0.1, 0.3 and 0.0 seconds, respectively. Corresponding reflective events for the source A and source B signals are shown in FIGS. 9 through 13 and 90 and 92, 100 and 102, 110 and 112, 120 and 122 and 130 and 132, respectively.

In FIGS. 9 through 13, the signals resulting from actuating the second source (source B) in each firing sequence now each have a time delay from start of recording (in this case the firing of source A as a time reference) of 0.5 seconds, and as a result are substantially time-aligned. True seismic signal from the second source (source B) may then be identified by using trace-to-trace and shot-to-shot coherence determination, just as used to determine first source true seismic signals where the first source firings are time aligned from the start of recording, as previously explained with reference to FIGS. 4 through 8.

The foregoing embodiments of the invention are described in terms of having two seismic energy sources at spaced apart positions. However, the invention is not limited in scope to having only two sources and identifying two trace to trace and shot to shot components. In other embodiments, three or more sources may be used. In such embodiments, the third, and any additional sources, are each fired sequentially in each firing sequence. For example, the system shown in FIG. 1 includes six sources SA1, SA2, SB1, SB, SC1, SC2. A third source, which may be any of the remaining unfired source in the system of FIG. 1 is fired after a selected time delay after the second source is fired. The time delay between firing the second source and the third source is different than the delay between firing the first source and the second source. The delay between firing the second source and the third source is also different in each firing sequence. As in the previous embodiments, it is preferred that the time delay between source firings in any one sequence be at least as long as the wavelet time for the immediately prior source firing. The delay times may be random, quasi-random or systematically determined, as in previous embodiments, and only need to be known. In embodiments using three or more sources, determining coherent signal components identified to the third and any additional sources includes time aligning the recorded signals with respect to the source for which reflective events are desired to be identified, and determining trace to trace and shot to shot coherent components of the time-aligned signals.

It has been determined that certain types of coherency processing for determining which of the seismic sources caused particular events in the detected seismic signals may provide improved separation of the events in the recorded seismic signals corresponding to each of the sources. One embodiment of such coherency processing will now be explained with respect to FIG. 14. At 134 in FIG. 14, seismic data recorded as explained above with respect to FIGS. 1–8 are sorted into a first three-dimensional domain such that signals resulting from actuations of the first seismic source (or source A) are coherent in all spatial directions. A preferred domain includes sorting individual traces such that along one spatial axis, the traces represent signals acquired such that the receivers (seismic sensors) in each of the streamers (2a–2d in FIG. 1) is disposed at substantially the same geographic position along the water surface at the firing times of the first source. Thus, a plane perpendicular to the selected spatial axis (and parallel to the time axis in a 3-D record section) would be called a "common channel plane." Traces sorted in the common-channel plane domain with respect to the first source actuation times will have signals that are coherent with respect to the actuation of the first source. The signals in traces sorted in the common channel plane with respect to the first source will be substantially incoherent with respect to the actuation times of the second source. As a matter of convenience, trace sorting to provide coherence with respect to actuation of the first source will be referred to as "first source coherency sorting." In one implementation of coherency sorting, the seismic traces are sorted in a three dimensional volume, in which common channels are disposed along one spatial axis, and common shots are disposed along the other spatial axis.

In a different implementation of coherency sorting, the seismic traces are sorted such that common depth point (CDP) traces are disposed along one spatial axis, and common offsets are disposed along the other spatial axis.

After first source coherency sorting, the coherency sorted traces are coherency filtered. Coherency filtering will remove a substantial portion of the incoherent energy present in the sorted data. In the present embodiment, as shown at 136 in FIG. 14, the coherency filtering includes weighted slant stack processing. Weighted slant-stack processing is described in U.S. patent application Ser. No. 09/767,650 filed on Jan. 23, 2001 and assigned to the assignee of the present invention and incorporated herein by reference. As described in more detail in the '650 application, weighted slant stack processing includes transforming the sorted traces from the space time domain, $S_{x, y}(t)$, into the slant-stack ($\tau$-$p_x$, $p_y$) domain. In the present embodiment, transforming the traces into the slant stack domain is performed using a Radon transform. A Radon transform may use an equation such as the following in which T represents the set of transformed data:

$$T(\tau, p_x, p_y) = N \sum_{x=a}^{b} \sum_{y=c}^{d} S_{x,y}(\tau + p_x x + p_y y, x, y) \cdot$$

$$F_{x,y}(\tau + p_x x + p_y y, x, y) / \sum_{x=a}^{b} \sum_{y=c}^{d} F_{x,y}(\tau + p_x x + p_y, y, x, y)$$

In the foregoing equation, N represents the number of traces, $S_{x, y}$ represents a subset of the whole volume of traces, and $F_{x,y}$ represents a scaling function. In the foregoing equation, x represents the distance along a first direction, and y represents the distance along a second direction. The distances correspond to seismic sensor positions on the water surface at the time the corresponding traces were recorded. $p_x$ represents a slope in the first direction, $p_y$ represents a slope in the second direction, a and b represent, for the first (x) direction, and c and d represent, for the second (y) direction, the endpoints along each respective direction of the spatial volume to be transformed. $\tau$ (tau) represents intercept time in the $\tau$-$p_x$, $p_y$ domain.

After transforming the coherency sorted traces, the transformed traces may be processed to exclude all but portions thereof representing coherent energy with respect to actuation times of the first source. An inverse Radon transform may then be performed to return the coherency filtered traces to the space-time domain. The result is a set of traces which include energy primarily resulting from actuation of the first source, as shown at 138 in FIG. 14.

Figure 14:
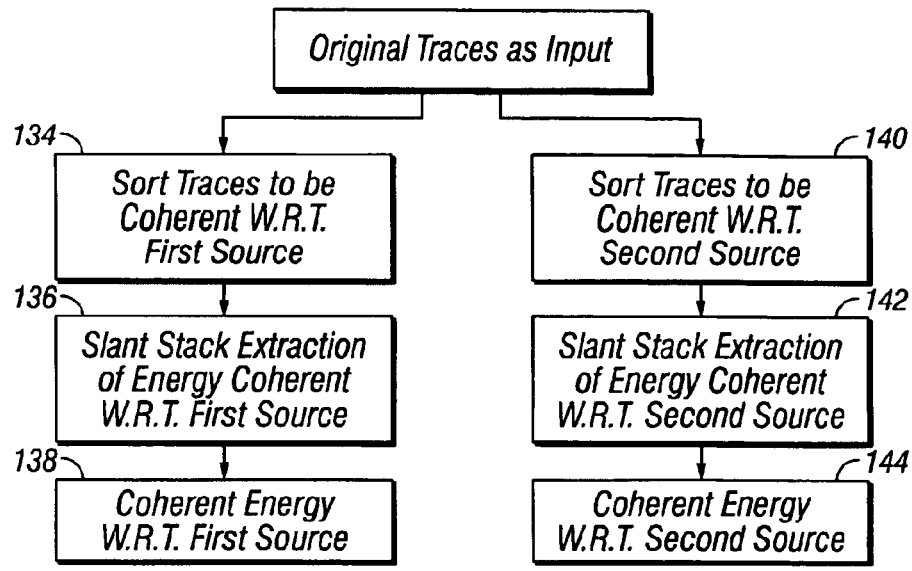
FIG. 14 shows a flow chart of one embodiment of a method according to the invention.

Next, the originally recorded seismic traces may be sorted into a domain which is coherent with respect to actuation times of the second source (or source B), as shown at 140 in FIG. 14. In the present embodiment, the sorting may be performed into the common channel/common shot domain with respect to the second source. Alternatively, the seismic traces may be sorted into the CDP/common offset domain. Similarly as for the first source coherency sorting, sorting the recorded traces to provide coherency with respect to actuation of the second source may be referred to for convenience as "second source coherency sorting." The second source coherency sorted traces may then be slant stack processed, as shown at 142 in FIG. 14 and as previously explained with respect the first source coherency sorted traces. The result of the combined second source coherency sorting and slant stack processing is a set of traces which include energy primarily resulting from actuation of the second source, as shown at 144 in FIG. 14.

Figure 15:
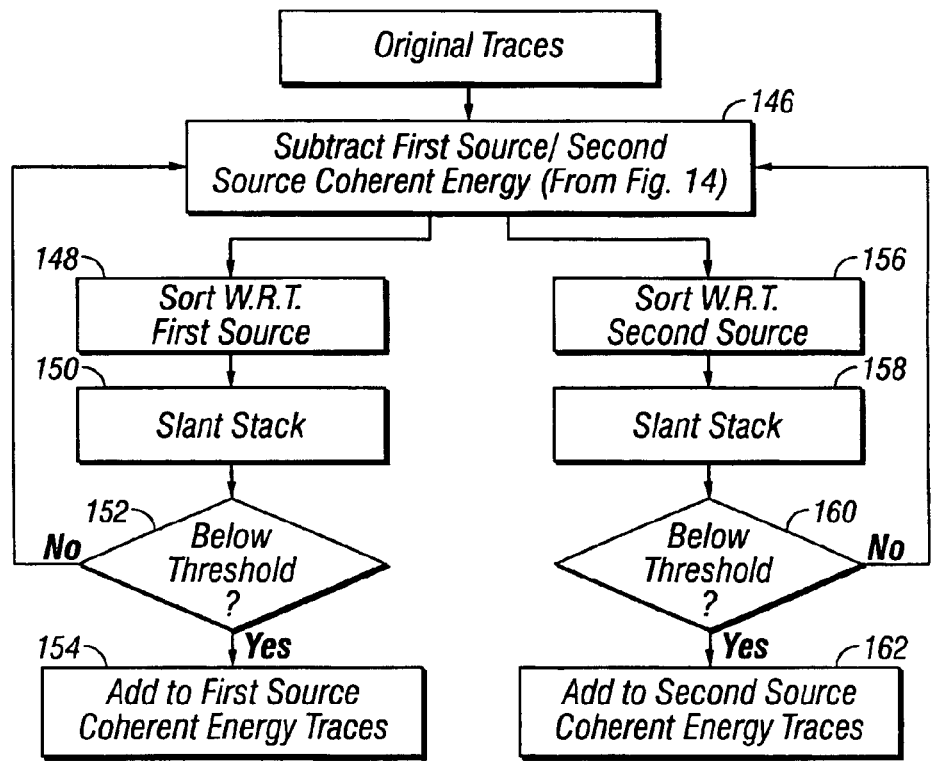
FIG. 15 shows a flow chart of one embodiment of a method according to the invention.

In theory, the two sets of traces generated as explained above provide trace sets including energy resulting only from actuation of the first source and the second source, respectively. As a practical matter, however, coherency filtering, including weighted slant stack processing, is not perfect. As a result, some energy resulting from actuations of the second source may remain in the trace set corresponding to the actuation of the first source, and some energy corresponding to the actuation of the first source may remain in the trace set corresponding to actuation of the second source. In one embodiment and referring to FIG. 15, the separation of seismic energy resulting from the first source and the second source in each of the respective trace sets can be improved by the following process.

First, the trace sets representing energy primarily from the first source and from the second source produced as explained above are both subtracted, as shown at 146, from the originally recorded set of traces to produce a "residual" trace set. The residual trace set includes energy from the first source and energy from the second source that was not separated using the above described coherency sorting and slant stack processing.

The residual trace set is then processed as explained above with respect to the originally recorded set. First, the residual trace set is sorted to be coherent with respect to the first source (first source coherency sorted), as shown at 148. Then the first source coherency sorted residual traces are transformed into the slant stack domain, and incoherent energy is then removed from the coherency sorted, transformed residual traces, as shown at 150. The coherent energy remaining in the processed traces may be inverse transformed into the space time domain. The result is a trace set having coherent energy with respect to the first source actuations still remaining in the residual traces and most of any remaining energy not coherent with respect to actuation of the first source removed.

The residual trace set is then sorted, as shown at 156, to be coherent with respect to the second source, and weighted slant stack processing, as shown at 158, is then performed to separate energy that is not coherent with respect to the second source actuations. The result is a trace set having coherent energy with respect to the second source actuations still remaining in the residual traces, and most of any remaining energy not coherent with respect to actuation of the second source removed.

A selected parameter corresponding to the amount of coherent energy with respect to each of the sources in each of the trace sets processed as above (coherency processed residual traces) from the residual trace set may then be compared to a selected threshold. Comparing for the respective processed trace sets is shown at 152 and 160 in FIG. 15. In one embodiment, the selected threshold may be a total energy in the traces. In another embodiment, the selected threshold may be a peak trace amplitude. In another embodiment, the selected threshold may be an average amplitude in the traces. Irrespective of the parameter used to select the threshold, if the parameter of the coherency processed residual traces exceeds the selected threshold, the coherency processed residual traces may then be subtracted from the residual traces, and the process as above repeated until the threshold is not exceeded. Any energy remaining in the final coherency processed residual traces may then be added, as shown at 154 and 162, respetively, to the corresponding coherency processed traces used as input to the residual processing described above with respect to FIG. 14.

The foregoing embodiments of a method for determining which components of a seismic signal are a result of a particular one of a plurality of seismic sources can take the form of a computer program stored in a computer readable medium. The program includes logic operable to cause a programmable computer to perform the steps explained above with respect to FIGS. 14 and 15.

Embodiments of a method according to the invention enable recording seismic surveys using a plurality of sources disposed at spaced apart positions such that the subsurface coverage of each sensor "streamer" is increased as compared with methods using only a single source. As compared with methods known in the art using multiple, spaced apart sources, methods according to the invention may provide the additional benefit of reducing a waiting time between firing the sources in firing sequences because signals from each of the plurality of sources may be uniquely identified in a shot sequence. Therefore, embodiments of a method according to the invention may increase the efficiency with which seismic surveying is performed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for separating energy resulting from actuating at least two different seismic energy sources from seismic signals, the method comprising:

sorting the seismic signals such that events therein resulting from actuations of the first source are substantially coherent in all spatial directions, the seismic signals resulting from a first one and a second one of the at least two sources actuated such that there is a variable time delay between successive actuations thereof;

coherency filtering the first source coherency sorted signals;

sorting the seismic signals such that events therein resulting from actuations of the second source are substantially coherent in all spatial directions; and coherency filtering the second source coherency sorted signals.

2. The method of claim 1 further comprising:

subtracting the coherency filtered first source coherency sorted signals and the coherency filtered second source coherency sorted signals from the seismic signals to generate residual seismic signals;

sorting the residual seismic signals such that events therein resulting from actuations of the first source are substantially coherent in all spatial directions;
coherency filtering the first source coherency sorted residual signals;
sorting the residual seismic signals such that events therein resulting from actuations of the second source are substantially coherent in all spatial directions; and
coherency filtering the second source coherency sorted residual signals.

3. The method of claim 2 further comprising:
determining whether a value of a parameter in the coherency filtered, first source and second source sorted residual signals exceeds a selected threshold, the parameter related to an amount of energy in a seismic signal;
subtracting the coherency filtered, first source sorted residual signals and the coherency filtered second source sorted residual signals from the residual signals; and
repeating the sorting and coherency filtering until the value drops below the selected threshold.

4. The method of claim 3 wherein the parameter comprises peak trace amplitude.

5. The method of claim 3 wherein the parameter comprises trace energy.

6. The method of claim 3 wherein the parameter comprises average trace amplitude.

7. The method of claim 2 further comprising adding the coherency filtered, first source sorted residual signals to the coherency filtered, first source sorted seismic signals.

8. The method of claim 2 further comprising adding the coherency filtered, second source sorted residual signals to the coherency filtered, second source sorted seismic signals.

9. The method of claim 1 wherein the sorting the seismic signals comprises generating a common channel plane gather with respect to the first source.

10. The method of claim 1 wherein the sorting the seismic signals comprises generating a common channel plane gather with respect to the second source.

11. The method of claim 1 wherein the coherency filtering comprises slant stack processing.

12. The method of claim 11 wherein the slant stack filtering comprises transforming traces into the tau-p domain, excluding portions of the transformed traces corresponding to energy other than a coherency reference, and inverse transforming portions of the traces having the excluded energy into the time-space domain.

13. The method of claim 12 wherein the transforming into the tau-p domain comprises performing a Radon transform.

14. The method of claim 1 wherein the sorting comprises sorting seismic traces into the common channel/common shot domain.

15. The method of claim 1 wherein the sorting comprises sorting seismic traces into the common depth point/common offset domain.

16. A method for seismic surveying, comprising:
towing a first seismic energy source and at least one seismic sensor system;
towing a second seismic energy source at a selected distance from the first seismic energy source;
actuating the first seismic energy source and the second seismic energy source in a plurality of firing sequences, each of the firing sequences including firing of the first source and the second source and recording signals generated by the at least one seismic sensor system, a time interval between firing the first source and the second source varied between successive ones of the firing sequences;
sorting the seismic signals such that events therein resulting from actuations of the first source are substantially coherent in all spatial directions;
coherency filtering the first source coherency sorted signals;
sorting the seismic signals such that events therein resulting from actuations of the second source are substantially coherent in all spatial directions; and
coherency filtering the second source coherency sorted signals.

17. The method of claim 16 further comprising:
subtracting the coherency filtered first source coherency sorted signals and the coherency filtered second source coherency sorted signals from the seismic signals to generate residual seismic signals;
sorting the residual seismic signals such that events therein resulting from actuations of the first source are substantially coherent in all spatial directions;
coherency filtering the first source coherency sorted residual signals;
sorting the residual seismic signals such that events therein resulting from actuations of the second source are substantially coherent in all spatial directions; and
coherency filtering the second source coherency sorted residual signals.

18. The method of claim 16 further comprising:
determining whether a value of a parameter in the coherency filtered, first source and second source sorted residual signals exceeds a selected threshold, the parameter related to an amount of energy in a seismic signal;
subtracting the coherency filtered, first source sorted residual signals and the coherency filtered second source sorted residual signals from the residual signals; and
repeating the sorting and coherency filtering until the value drops below the selected threshold.

19. The method of claim 18 wherein the parameter comprises peak trace amplitude.

20. The method of claim 18 wherein the parameter comprises trace energy.

21. The method of claim 18 wherein the parameter comprises average trace amplitude.

22. The method of claim 17 further comprising adding the coherency filtered, first source sorted residual signals to the coherency filtered, first source sorted seismic signals.

23. The method of claim 17 further comprising adding the coherency filtered, second source sorted residual signals to the coherency filtered, second source sorted seismic signals.

24. The method of claim 16 wherein the sorting the seismic signals comprises generating a common channel plane gather with respect to the first source.

25. The method of claim 16 wherein the sorting the seismic signals comprises generating a common channel plane gather with respect to the second source.

26. The method of claim 16 wherein the coherency filtering comprises slant stack processing.

27. The method of claim 26 wherein the slant stack processing comprises transforming traces into the tau-p domain, excluding portions of the transformed traces corresponding to energy other than a coherency reference, and inverse transforming portions of the traces having the excluded energy into the time-space domain.

28. The method of claim 27 wherein the transforming into the tau-p domain comprises performing a Radon transform.

29. The method of claim 16, wherein the time interval is varied systematically.

30. The method of claim 16 wherein the time interval is varied quasi-randomly.

31. The method of claim 16, wherein the time interval varied is randomly.

32. The method of claim 16, wherein the time interval is varied in steps of about 100 milliseconds.

33. The method as defined in claim 16, wherein the time interval is at least as long as a wavelet time of the first source.

34. The method of claim 16 wherein the sorting comprises sorting seismic traces into the common channel/common shot domain.

35. The method of claim 16 wherein the sorting comprises sorting seismic traces into the common depth point/common offset domain.

36. A program stored in a computer readable medium, the program including logic operable to cause a programmable computer to perform steps comprising:

sorting seismic signals resulting from actuating at least two different seismic energy sources, the sources actuated to provide a variable time delay between successive actuations of a first one and a second one of the sources, the sorting performed such that events therein resulting from actuations of the first source are substantially coherent in all spatial directions;

coherency filtering the first source coherency sorted signals;

sorting the seismic signals such that events therein resulting from actuations of the second source are substantially coherent in all spatial directions; and coherency filtering the second source coherency sorted signals.

37. The program of claim 36 further comprising logic operable to cause the computer to perform:

subtracting the coherency filtered first source coherency sorted signals and the coherency filtered second source coherency sorted signals from the seismic signals to generate residual seismic signals;

sorting the residual seismic signals such that events therein resulting from actuations of the first source are substantially coherent in all spatial directions;

coherency filtering the first source coherency sorted residual signals;

sorting the residual seismic signals such that events therein resulting from actuations of the second source are substantially coherent in all spatial directions; and coherency filtering the second source coherency sorted residual signals.

38. The program of claim 37 further comprising logic operable to cause the computer to perform:

determining whether a value of a parameter in the coherency filtered, first source and second source sorted residual signals exceeds a selected threshold, the parameter related to an amount of energy in a seismic signal;

subtracting the coherency filtered, first source sorted residual signals and the coherency filtered second source sorted residual signals from the residual signals; and repeating the sorting and coherency filtering until the value drops below the selected threshold.

39. The program of claim 36 wherein the parameter comprises peak trace amplitude.

40. The program of claim 36 wherein the parameter comprises trace energy.

41. The program of claim 36 wherein the parameter comprises average trace amplitude.

42. The program of claim 37 further comprising logic operable to cause the computer to perform adding the coherency filtered, first source sorted residual signals to the coherency filtered, first source sorted seismic signals.

43. The program of claim 37 further comprising logic operable to cause the computer to perform adding the coherency filtered, second source sorted residual signals to the coherency filtered, second source sorted seismic signals.

44. The program of claim 36 wherein the sorting the seismic signals comprises generating a common channel plane gather with respect to the first source.

45. The program of claim 36 wherein the sorting the seismic signals comprises generating a common channel plane gather with respect to the second source.

46. The program of claim 36 wherein the coherency filtering comprises slant stack processing.

47. The program of claim 46 wherein the slant stack filtering comprises transforming traces into the tau-p domain, excluding portions of the transformed traces corresponding to energy other than a coherency reference, and inverse transforming portions of the traces having the excluded energy into the time-space domain.

48. The program of claim 47 wherein the transforming into the tau-p domain comprises performing a Radon transform.

49. The program of claim 36 wherein the sorting comprises sorting seismic traces into the common channel/ common shot domain.

50. The program of claim 36 wherein the sorting comprises sorting seismic traces into the common depth point/ common offset domain.

* * * * *